United States Patent [19]

Anand

[11] 4,112,203

[45] Sep. 5, 1978

[54] ALKALI METAL/SULFUR BATTERY

[75] Inventor: Joginder N. Anand, Clayton, Calif.

[73] Assignee: The Dow Chemical Company, Midland, Mich.

[21] Appl. No.: 789,610

[22] Filed: Apr. 21, 1977

Related U.S. Application Data

[63] Continuation-in-part of Ser. No. 702,649, Jul. 6, 1976, abandoned.

[51] Int. Cl.² .......................................... H01M 10/39
[52] U.S. Cl. ................................... 429/104; 429/112
[58] Field of Search ............... 429/104, 103, 101, 102, 429/191, 30, 31, 112, 113, 117, 120, 72

[56] References Cited

U.S. PATENT DOCUMENTS

| T876,003 | 7/1970 | Hever | 429/104 |
|---|---|---|---|
| 3,811,943 | 5/1974 | Minck et al. | 429/104 |
| 3,883,367 | 5/1975 | Chiku et al. | 429/104 |
| 3,953,227 | 4/1976 | Jones et al. | 429/218 X |
| 3,980,496 | 9/1976 | Ludwig et al. | 429/103 |
| 3,994,745 | 11/1976 | Ludwig | 429/81 |
| 4,038,465 | 7/1977 | Ludwig et al. | 429/104 |

Primary Examiner—Anthony Skapars
Attorney, Agent, or Firm—Robert R. Stringham

[57] ABSTRACT

Alkali metal/sulfur batteries in which the electrolyte-separator is a relatively fragile membrane are improved by providing means for separating the molten sulfur/sulfide catholyte from contact with the membrane prior to cooling the cell to temperatures at which the catholyte will solidify. If the catholyte is permitted to solidify while in contact with the membrane, the latter may be damaged. The improvement permits such batteries to be prefilled with catholyte and shipped, at ordinary temperatures.

11 Claims, 2 Drawing Figures

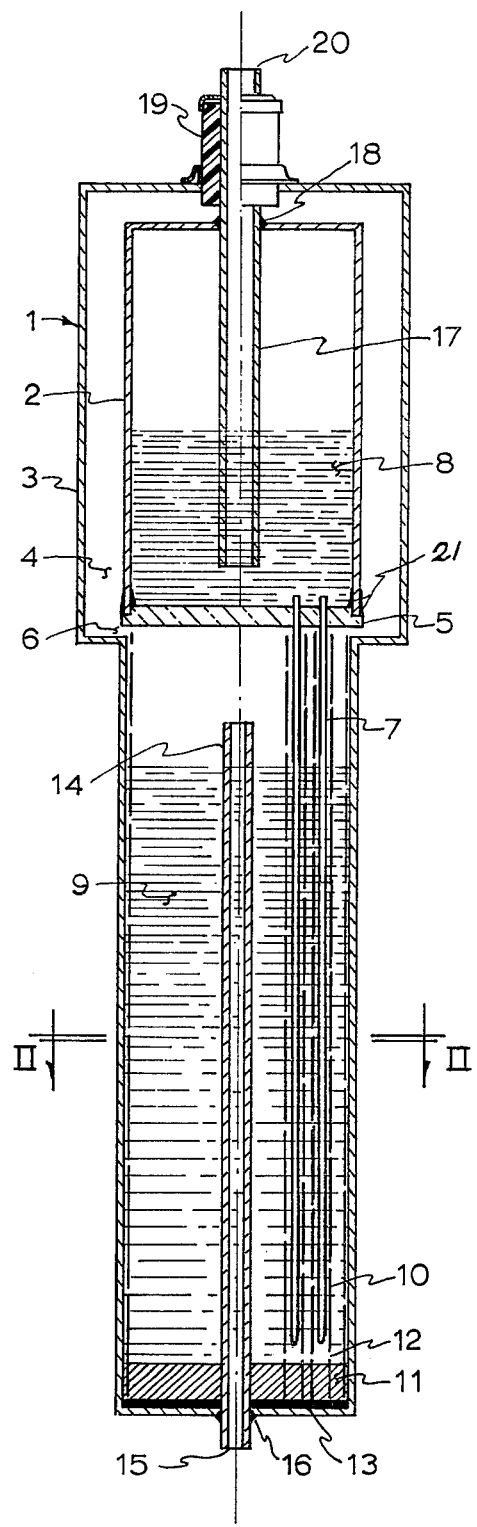
FIG. I

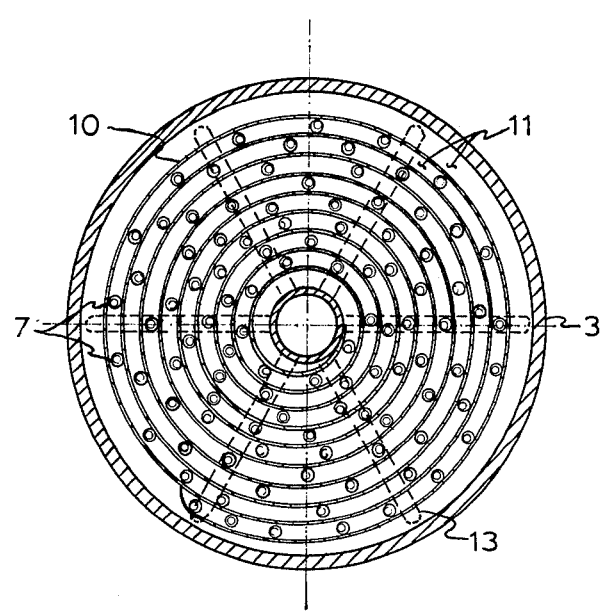
FIG. II

ALKALI METAL/SULFUR BATTERY

The present invention was made in the course of Research Contract C(11-1)25-65, with the U.S. Energy Research and Development Administration.

CROSS-REFERENCE TO RELATED APPLICATION

The present Application is a continuation-in-part of my co-pending Application Ser. No. 702,649, filed July 6, 1976, now abandoned.

BACKGROUND OF THE INVENTION

Recent battery technology, such as is disclosed in U.S. Pat. No. 3,476,602 discloses the use of a molten alkali metal anode/anolyte and a molten sulfur/alkali metal sulfide catholyte separated by an alkali metal ion-permeable membrane/electrolyte. A cathodic current collector, or "cathode" is immersed in the catholyte. When the anode and cathode are connected through an external electrical circuit, electrons are discharged to this circuit from the anode with formation of positively charged alkali metal ions. These ions migrate through the membrane into the catholyte. Negatively charged sulfide (polysulfide) ions are formed in the catholyte by interaction of sulfur at the cathode surface with electrons received from the external circuit.

In one embodiment of such a battery, the membrane is in the form of a multiplicity of sodium-filled hollow glass fibers closed at one end and open at the other. The open ends of the fibers communicate with a reservoir of molten sodium and the fibers are immersed in the molten polysulfide catholyte, the anolyte (sodium) and catholyte being separated by a "tube sheet" through which the fibers pass in sealing arrangement. In this embodiment, a large anode area by a afforded by closely spacing a large number of the fine hollow fibers in a given cell or battery volume.

U.S. Pat. No. 3,791,868 discloses a battery cell of the preceding type in which the cathodic electrode is a metallic sheet wrapped into the shape of a coil and the alkali-metal filled fibers are disposed between successive wraps of the coil. The sulfur/sulfide (polysulfide) catholyte fills the spaces between adjacent fibers and between the fibers and foil wraps.

Contemplated operating temperatures for alkali metal/sulfur batteries range from about 200°–400° C. It is generally convenient, or even necessary, to introduce the sulfur to such a battery in the form of a melt, which may consist of sulfur as such or as a polysulfide of the alkali metal to be employed as the anolyte. Given the presence of the alkali metal in the cell, the latter can then be heated to the desired operating temperature and operated. If the cell is loaded with the sulfur-containing catholyte (and the alkali metal) just prior to being used, there is no reason to let the temperature drop so low that solidification of the catholyte will result. On the other hand, if it is not intended to operate the cell at the location where it is filled, or if operation is to be suspended, it is an obvious desideratum to be able to let the cell cool to ordinary temperatures. However, membrane breakage and consequent electrical shorting may result when the catholyte is allowed to solidify in contact with the membrane. Membranes in the form of fine hollow fibers are very thin and the fibers are usually surrounded by the catholyte. Consequently, membranes of this form are particularly susceptible to such damage.

Accordingly, it is an object of the present invention to provide an alkali metal/sulfur cell (or battery) in which the electrolyte-separator is a glass or ceramic membrane and which is so designed that the catholyte it contains can be removed from substantial contact with the membrane and then allowed to solidify.

A particular object is to provide a cell of the foregoing type in which the membrane takes the form of a plurality of hollow fibers or tubules.

A further object is to provide such a cell in which the solidified catholyte can be remelted and then redisposed in contact with the membrane. A corollary to the latter object is to be able to initially load the catnolyte (or the sulfur component thereof) into the cell as powdered (fluidized) solid which can subsequently be melted and relocated in contact with the membrane.

An additional object is to provide a method of shutting down operation of an alkali metal/sulfur cell whereby catholyte solidification will not result in membrane damage and the cell is not rendered incapable of being put back into operation.

Still other objects will be apparent from the following disclosure.

SUMMARY OF THE INVENTION

The present invention is an alkali metal/sulfur battery cell which is adapted to being cooled below the solidification temperature of the catholyte without undergoing damage to the electrolyte/separator membrane. The invention also comprises the method of carrying out said cooling wherein the molten catholyte is first removed from substantial contact with the membrane to a location from whence it can be returned as a melt to recontact the membrane, and is then cooled in said location until solidified. The invention additionally comprises a method of loading a catholyte material into the cell wherein the catholyte is placed in said location as a solid and is subsequently melted and redisposed in the cell to contact the membrane.

More specifically, the cell of the present invention is an alkali metal/sulfur battery cell in which the electrolyte/separator is a membrane of such character as to be damaged if a catholyte consisting essentially of an alkali metal M and sulfur in an M/S atomic ratio of from 1/100 to $\frac{1}{2}$ is allowed to solidify in the locus occupied by the catholyte during operation of said cell, said cell comprising means for effecting transfer of molten catholyte in either direction between said locus and a different location wherein solidification of the catholyte will not damage the membrane.

Preferably, said different location is a reservoir space with the casing of the cell and said means is a passageway between said locus and said reservoir through which the molten catholyte will be caused to flow by gravity if the attitude of the cell is appropriately altered. A particularly important application of the present invention is to cells of the foregoing type in which the membrane is in the form of a plurality of hollow fibers or tubules (preferably consisting of an alkali-metal permeable glass or ceramic material).

BRIEF DESCRIPTION OF THE DRAWINGS

FIG. 1 is a vertical sectional view of device embodying the invention; and

FIG. 2 shows a cross-section of the device of FIG. 1 taken along line II—II.

DETAILED DESCRIPTION

To facilitate understanding of the invention disclosed above, FIGS. I and II will now be described. In FIG. I, a preferred embodiment of the invention is shown in which the battery cell (indicated generally by reference number 1) is seen in vertical section and comprises a generally cylindrical, inverted anolyte cup 2 and a generally cylindrical, metallic (aluminum or stainless steel, for example) catholyte container 3, the uppermost portion of which, together with the external surface of the anolyte cup, forms a catholyte reservoir 4 which is empty when the cell is positioned as shown. The mouth of the anode cup is closed by and sealingly engaged (by annular solder glass beads 21) with the peripheral portion of the uppermost surface of an electrically non-conducting tubesheet disc 5, the perimeter of which is separated from the catholyte container by an annular passageway 6 between the upper and lower portions of the catholyte container.

A large number of fine hollow glass fiber lengths 7 (a few of which are shown on a greatly exaggerated scale), having their lower ends closed and their upper ends open, pass through the tubesheet in sealing arrangement therewith. The open ends of the fibers communicate with the molten alkali metal 8 in the anolyte cup and the portions of the fibers below and depending from the tubesheet are immersed in a corresponding alkali metal polysulfide (or sulfur, prior to any discharge) melt 9, the volume of which is not substantially greater than the capacity of reservoir 4. The fiber lengths are disposed generally parallel to each other in a continuous spiral of generally concentric vertical rows and constitute a generally cylindrical bundle.

Disposed between the rows of fibers within the bundle and wrapped around the bundle at least once is a cathodic current collector 10 consisting of a thin, flexible, elongated sheet of a metal or metal alloy, such as aluminum, preferably coated with graphite or molybdenum disulfide. The sheet is wider than the fibers are long and extends vertically from just below the tubesheet to below the closed ends of the fibers.

A metallic spacer tape 11 having a thickness somewhat greater than a fiber diameter is disposed between and in compression contact with the portions of the cathode sheet depending below the closed fiber ends.

The cathode sheet is pierced by perforations 12 to facilitate catholyte flow into or out of the spaces between the cathode sheet and fibers.

The bottom edges of the cathode sheet and spacer tape are joined by weld beads 13 formed along several diameters of the generally circular bottom surface of the assembly. These beads contact the bottom of the catholyte container and are joined to the lower portion of a hollow mandrel 14 on which the fiber/cathode sheet/spacer tape assembly was rolled up. The ends of the mandrel are open, so that it can also function as a conduit for flow of catholyte into or out of the cell. The protruding lower end 15 of the mandrel is sealingly joined to the bottom of the catholyte container by a weld 16 and, with suitable valve means (not shown), functions as a catholyte port.

A tubular anode lead (anodic current collector) 17, which also functions as an anolyte conduit, passes through the top of the anolyte cup, to which it is sealingly joined by a weld 18. The anode lead also extends through a seal 19 which electrically insulates the anode lead from the catholyte container (outermost housing) to which the seal is fixed. The protruding upper end 20 of the anode lead, in conjunction with suitable valve means (not shown), functions as an anolyte port.

In conjunction with suitable electrical connections (not shown) the protruding ends (15 and 20, respectively) of conduits 14 and 17 also are utilized to connect the battery cell to an external electrical circuit.

FIG. II shows an end-on view looking down on the spirally wrapped assembly of fibers 7 and cathode sheet 10 at section II-II of FIG. 1, as it would appear when no catholyte is present in the lower portion of the catholyte container 3. Reference numbers 11 and 13 respectively denote the spacer tape (the upper edge being seen in this view) and the weld beads (in phantom) across the bottom of the assembly.

Details as to fiber materials, catholyte compositions, tubesheet compositions, sealing glasses, cathode sheet materials and coatings and assembly methods suitable for the practice of the present invention are given in U.S. Pat. Nos. 3,476,602; 3,679,480; 3,749,603; 3,829,331; 3,791,868; 3,877,995 and 3,917,490. All of the battery cells disclosed in the foregoing patents are adapted to be operated both in charge and discharge modes, i.e., are rechargeable.

Heating means (not shown in the drawings) of any suitable type may be employed to bring the cells of the invention to the required operating temperature (at least as high as the melting point of anolyte or catholyte, whichever is higher). An electrical resistance type heating element, coiled around the outside of the casing (the catholyte container in FIG. I and FIG. II) is particularly appropriate, since it can be heated by a parasitic shunt current drawn from the cell itself, once the operating temperature is reached.

The cell depicted in the drawings is a particular species of a preferred embodiment of the present invention in which a cell as "more specifically" described in the foregoing summary comprises:

(a) a generally cylindrical anolyte cup, inverted above and sealingly engaged with the peripheral portion of the uppermost surface of a horizontal electrically non-conducting tubesheet disc;

(b) a plurality of fine hollow fiber lengths constituting said electrolyte/separator, each of said fiber lengths having an open end and a closed end, said fiber lengths being disposed in a closely spaced generally parallel vertical array and passing through said tube-sheet disc, in sealing engagement therewith, so that their open ends coincide with or are adjacent to the uppermost surface of said disc and the portions of said fiber lengths not engaged with said disc depend therefrom;

(c) cathodic current collecting means disposed adjacent the dependent portions of said fiber lengths;

(d) a casing enclosing the foregoing elements a-c, and having (1) a lower portion containing said dependent fiber lengths and said cathode current collecting means, the spaces between said dependent fiber lengths, said cathodic current collecting means and the interior wall of said casing constituting said locus, and (2) an upper portion of such size and shape that the space between its interior surface and the exterior of said anolyte cup constitutes a catholyte reservoir which is at least equal in volume to said locus, and the space between said interior surface and the periphery of said tubesheet disc constitutes an internal annular passageway between said reservoir and said locus, and (e) means for introducing anolyte and catholyte to said anolyte cup and said catholyte reservoir respectively, and (f) anodic current collecting means.

Ordinarily, said anodic and cathodic current collecting means will be adapted to be connected with each other through an electrical circuit external to said cell, as by extending through the cell casing, as shown in the drawings.

In a method aspect, the present invention can be practised with the cell shown in the drawings, simply by turning it upside down so that the molten catholyte 9 can drain into the reservoir space (6, in FIG. I).

Due to the very strong wetting of the fiber interiors by the molten anolyte (alkali metal) and capillary attraction, the anolyte will not drain out of the fibers when the cell is inverted. However, if the cell is cooled sufficiently to permit solidification of the anolyte within the fibers, no damage to the cell appears to result.

Once the catholyte in the reservoir has cooled and solidified, the cell can be handled and shipped at ordinary temperatures. It may be restored to operating condition by reheating in the inverted position to melt the catholyte and turning the cell upright to let the catholyte flow down into the spaces between the fibers, between the fibers and the cathode sheet and between the exterior wrap of the cathode sheet and the interior surface of the lower portion of the catholyte container.

If a catholyte port is provided at the top of the catholyte container, in addition to or instead of the port (15 in FIG. I) at the bottom of the container, the catholyte may be introduced in the reservoir space (6 in FIG. I) as a flowable solid. In general, however, it is necessary to introduce the anolyte to the fiber interiors (and the supervening anolyte cup) as a liquid, thereby requiring heating, and it is then convenient to also introduce the catholyte as a melt.

If desired, the catholyte may be charged to the reservoir as a melt, with the cell in inverted position, and then allowed to solidify in place.

In the embodiment shown in the drawings, the space between the fibers, etc., constitutes the locus occupied by the catholyte during operation of the cell and the reservoir space constitutes a different location wherein solidification of the catholyte will not damage the fibers. The passageway (6 in FIG. I) constitutes a means for effecting transfer of molten catholyte in either direction between said locus and said different location. This embodiment thus provides a maximum compactness and simplicity of means and munipulations to effect catholyte transfer and is accordingly preferred.

The catholyte reservoir may be located other than around the anolyte cup without losing the advantages of a unitary, sealed assembly (such cells are evacuated before being charged with anolyte and catholyte and are subsequently sealed). Thus, for example, a catholyte reservoir may be formed as a blister on the outside of the casing (catholyte container) above and connected at its lower extremity to the uppermost part of the section of catholyte container in which the catholyte resides during operation of the cell. The catholyte can then be transferred to the reservoir simply by placing the cell on its side, with the blister underneath. Other possible modifications will be apparent to those skilled in the art.

Alternatively, the different location to which the catholyte is transferred may be outside of the cell casing and the transfer means may be an appropriately located catholyte port through which, in conjunction with appropriate other means, molten catholyte may be removed from or introduced to the cell by gravity flow or by pumping. This alternative is of most interest where a number of cells are to be operated together (in series or in parallel connection) as a battery. In this instance, a common catholyte reservoir separate from the cells but connectable to any or all of them may be incorporated in the battery case (or outside of same) for the purposes of the invention.

A particularly important aspect of the present invention is the method of deactivating and subsequently reactivating an alkali metal/sulfur cell of the present invention (as "more specifically" defined in the preceding SUMMARY) wherein the molten catholyte is transferred through said transfer means from said locus to said different location, caused to solidify and is subsequently remelted and transferred back to said locus through said means.

The drawings in this application are for purposes of illustration and, although exemplifying all elements recited in the claims, are not to be construed as limiting the scope of the invention other than according to said claims.

Thus, the function of the cathode sheet in the embodiment depicted in the drawings may be accomplished by any of the various equivalent cathode members disclosed in the several U.S. patents referred to earlier herein. Similarly, the fiber lengths (or equivalent tubules) may be disposed in vertical rows which do not constitute a continuous spiral: i.e., in any other functionally equivalent arrangement or geometric configuration, such as, for example, those described in the above numbered patents and elsewhere in the literature.

Although glasses and ceramics are the materials ordinarily employed as electrolyte/separator membranes in such battery cells, the present invention is applicable to the use of membranes of any otherwise suitable membrane material which may be unable to adequately withstand the forces exerted by a given catholyte as it solidifies in situ.

The general susceptibility of the electrolyte/separator membrane in a cell of a given design to damage by catholyte solidification in-situ can conveniently be tested with a representative catholyte consisting of sodium and sulfur in the ratio of from 9.5 to 11.5 sulfur atoms per atom of sodium, i.e., with a sodium polysulfide of composition $Na_2S_5.S_{14-16}$. However, the present invention resides in a cell which is designed so that the catholyte may be removed from substantial contact with the membrane before it is allowed to solidify and — in its broadest aspect — does not depend on the actual presence of a catholyte in the cell or on any particular catholyte composition being employed with the cell. That is, the present invention is generally of use wherever it is contemplated to cool an alkali metal/sulfur cell to temperature at which catholyte solidification will result and the catholyte consists essentially of an alkali metal M and sulfur in an M/S atomic ratio within the range of from about 1/100 to about ½.

As a practical matter, M will usually be Li, Na or K, but cells of the present invention may be used with catholytes (and anolytes) in which M is any other alkali metal.

Whether or not a membrane of a given composition and configuration may be damaged if subjected to the forces exerted by a catholyte of a given composition during solidification thereof, may be determined by subjecting an otherwise satisfactory test model of a cell comprising the membrane and catholyte to one or more catholyte solidification/remelting cycles and noting any change in internal resistance or drop in discharge voltage such as to rule out further utility of the cell for its intended application.

Specific known membrane configurations other than hollow fibers are exemplified by tubules (see U.S. Pat. No. 3,413,150) and tubes (see U.S. Pat. No. 3,953,227).

In theory, the catholyte in a fully charged alkali metal/sulfur battery cell will consist simply of sulfur. As a practical matter, however, some alkali metal sulfide must be present in order to provide at least some initial conductivity to the molten catholyte.

I claim:

1. An alkali metal/sulfur battery cell in which the electrolyte/separator is in the form of a plurality of hollow fibers of such character as to be damaged if a catholyte consisting essentially of an alkali metal M and sulfur in an M/S atomic ratio within the range of from about 1/100 to about $\frac{1}{2}$ is allowed to solidify in the locus occupied by the catholyte during operation of said cell, said cell comprising means for emptying said locus of said molten catholyte and transferring it to a different location wherein solidification of said catholyte will not damage the fibers, said cell being adapted to alternately be charged and discharged without utilization of said transfer means during such operation.

2. A cell as in claim 1 additionally comprising an internal catholyte reservoir which constitutes said different location and is connected by said transfer means to said locus.

3. A cell as in claim 1 operably connected by said transfer means to a catholyte reservoir which is external to said cell and constitutes said different location.

4. A cell as in claim 2 in which said transfer means is an internal passageway and flow of catholyte therethrough between said reservoir and said locus will occur, under the influence of gravity, when the attitude of the cell in space is appropriately altered.

5. A cell as in claim 4 comprising:
(a) a generally cylindrical anolyte cup, inverted above and sealingly engaged with the peripheral portion of the uppermost surface of an, electrically non-conducting tubesheet disc:
(b) a plurality of fine hollow fiber lengths constituting said electrolyte/separator, each of said fiber lengths having an open end and a closed end, said fiber lengths being disposed in a closely spaced generally parallel vertical array and passing through said tubesheet disc, in sealing engagement therewith, so that their open ends coincide with or are adjacent to the uppermost surface of said disc and the portions of said fiber lengths not engaged with said disc depend therefrom;
(c) cathodic current collecting means disposed adjacent the dependent portions of said fiber lengths;
(d) a casing enclosing the foregoing elements a-c, and having
 (1) a lower portion containing said dependent fiber lengths and said cathodic current collecting means, the spaces between said dependent fiber lengths, said cathodic current collecting means and the interior wall of said casing constituting said locus, and
 (2) an upper portion of such size and shape that the space between its interior surface and the exterior of said anolyte cup constitutes a catholyte reservoir which is at least equal in volume to said locus, and the space between said interior surface and the periphery of said tubesheet disc constitutes an internal, annular passageway between said reservoir and said locus, and
(e) means for introducing anolyte and catholyte to said anolyte cup and said catholyte reservoir respectively, and
(f) anodic current collecting means.

6. A battery cell of claim 1 containing an alkali metal polysulfide catholyte which, if allowed to solidify in said locus, will damage said membrane.

7. A method of inactivating a cell as described in claim 6 which comprises transferring said catholyte, as a melt, from said locus through said transfer means to said different location and then causing the catholyte to solidify.

8. The method of claim 7 additionally comprising reactivating said cell by remelting said catholyte and returning it to said locus through said transfer means.

9. A method of introducing catholyte to a cell as described in claim 1, said method comprising introducing said catholyte as a solid to said different location, melting it and transferring it through said transfer means to said locus.

10. A method of introducing catholyte to a cell as described in claim 2, said method comprising introducing said catholyte as a melt to said catholyte reservoir and then causing it to solidify in place.

11. A plurality of cells as in claim 3 contained, together with said transfer means and said catholyte reservoir, within a common battery housing.

* * * * *